J. R. SEARIGHT.
SHEARS.
APPLICATION FILED JULY 16, 1909.

942,043.

Patented Nov. 30, 1909.

WITNESSES.
Clarence E. Day
Virginia C. Spratt

INVENTOR.
John R. Searight
by Parker & Burton Attorneys.

UNITED STATES PATENT OFFICE.

JOHN R. SEARIGHT, OF DETROIT, MICHIGAN, ASSIGNOR TO THE DETROIT SHEAR COMPANY, OF DETROIT, MICHIGAN.

SHEARS.

942,043.  Specification of Letters Patent.  Patented Nov. 30, 1909.

Application filed July 16, 1909. Serial No. 507,893.

*To all whom it may concern:*

Be it known that I, JOHN R. SEARIGHT, citizen of the United States, residing at Detroit, county of Wayne, State of Michigan, have invented a certain new and useful Improvement in Shears, and declare the following to be a full, clear, and exact description of the same, such as will enable others skilled in the art to which it pertains to make and use the same, reference being had to the accompanying drawings, which form a part of this specification.

This invention relates to shears for cutting heavy material.

It has for its object an improved auxiliary lever and a link connection between the blades of the shears and the auxiliary lever, by which increased leverage is obtained and a greater control of the cutting blades made possible.

Figure 1:
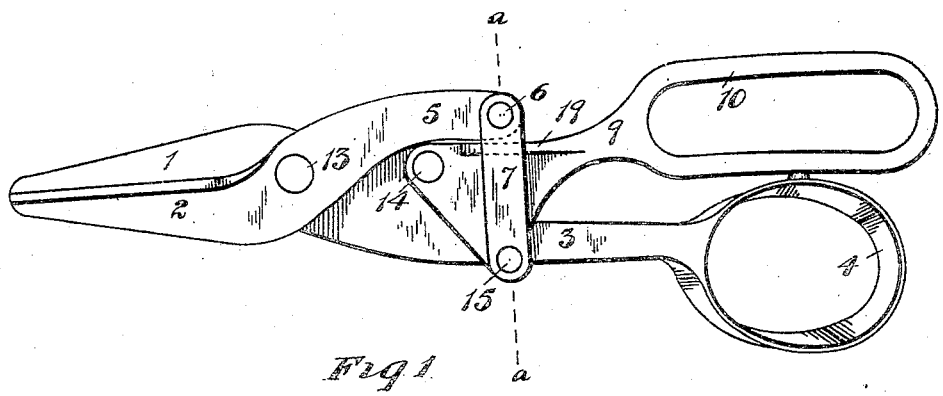
Figure 2:
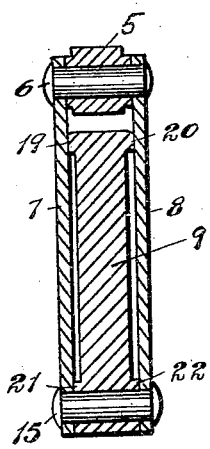

In the drawings:—Figure 1, is a side elevation of the improved shears. Fig. 2, is a cross-section on the line *a—a* in Fig. 1.

The two blades with their rear extensions or handles are pivoted together. The blades 1 and 2 are pivoted at 13. The blade 1 has an extension 3 terminating with a thumb ring 4. The blade 2 has an extension 5 and near its terminal a pivot 6, by which is pivoted to the extension 5 a pair of links 7 and 8, one of which engages on each side of the pivot end of the auxiliary handle lever 9, which terminates with the hand ring 10. The rear extension 3 immediately at the rear of the pivot 13 broadens and is provided with a pivot hole for pivot 14, which is located at the rear of the pivot 13 and is substantially in line with the cutting edge of the blade 1. The pivot end of the auxiliary lever 9 is broadened, and that edge of it which lies to the front is inclined to the axis of the lever, assuming the axis to run from the center of the pivot 14 through the hand ring 10, along approximately the middle line of the hand ring 10. On the point which is distant from the pivot 14 is a pivot hole for the second pivot 15. The pivots 6 and 15 are joined by links 7 and 8, one on each side of the broad pivot end of the auxiliary lever 9. Along that edge of the auxiliary lever which lies between the pivot 14 and the hand ring are ribs 19 and 20 along the edge of the member on each side thereof to furnish a bearing which lifts the link off from the main tabular surface of the lever. At this pivot 15 under each link 7 and 8 is a raised boss similar to a washer but preferably fixed to the auxiliary lever, the raised boss 21 on one side holding the link 7 from contact with the greater part of the tabular surface of the member and the raised boss 22 on the opposite side of the member holding the link 8 away from the main part of the tabular surface of the member. The two links 7 and 8 co-acting with the pivots 6 and 15 control the action of the blade 2 so that the user of the shears can hold the two cutting blades in their proper relation for the proper shearing work for which the tool is intended.

The action of the shears linked in the way shown in the drawing and in the manner described, has been heretofore described in my application No. 462,593, filed by me November 14, 1908. I have found in practical development of the invention that the single link there shown was not adequate to prevent the improper twisting of one shear blade with respect to the other, and I have found that when double links were used it affords a proper and sufficient control to prevent such twisting motion of one blade with respect to the other.

What I claim is:—

A shearing tool, having in combination a main blade, a shearing blade pivoted thereto, an auxiliary lever provided with a hand ring, pivoted at its end to the main blade, and a pair of link members pivoted at one end of each on the opposing faces of that portion of the shearing blade remote from its cutting portion, and at the other end of each on the sides of the auxiliary lever, at a point so located thereon with respect to its point of pivoting to the main blade that the axial line passing through the two pivots on the main blade is traversed thereby when the implement is opened and closed, said pair of link members serving to equalize and distribute between the two faces of the shearing blade the strain incident to the operation of the shearing members upon an interposed sheet of metal, substantially as described.

In testimony whereof, I sign this specification in the presence of two witnesses.

JOHN R. SEARIGHT.

Witnesses:
CHARLES F. BURTON,
VIRGINIA C. SPRATT.